United States Patent
Mehta et al.

(10) Patent No.: US 10,200,855 B1
(45) Date of Patent: Feb. 5, 2019

(54) WIRELESS COMMUNICATION SYSTEM FOR ADAPTIVE MULTIPLE-INPUT MULTIPLE-OUTPUT (MIMO) TRANSMISSION MODES

(71) Applicant: Sprint Communications Company L.P., Overland Park, KS (US)

(72) Inventors: Dhaval Dipak Mehta, Aldie, VA (US); Jasinder Pal Singh, Olathe, KS (US); Udit A. Thakore, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 80 days.

(21) Appl. No.: 15/363,975

(22) Filed: Nov. 29, 2016

(51) Int. Cl.
*H04W 8/24* (2009.01)
*H04W 8/20* (2009.01)
*H04B 7/0456* (2017.01)
*H04W 4/02* (2018.01)
*H04B 17/336* (2015.01)

(52) U.S. Cl.
CPC ............ *H04W 8/24* (2013.01); *H04B 7/0486* (2013.01); *H04B 17/336* (2015.01); *H04W 4/027* (2013.01); *H04W 8/20* (2013.01)

(58) Field of Classification Search
CPC ......... H04W 8/24; H04W 8/20; H04W 4/027; H04W 72/0413; H04W 24/02; H04W 72/0406; H04W 28/18; H04W 48/16; H04W 4/04; H04W 4/043; H04W 4/046; H04B 7/0486; H04B 17/336; H04B 7/0417; H04B 7/0413; H04B 7/0452; H04B 7/0689; H04L 2025/03426
See application file for complete search history.

(56) References Cited

U.S. PATENT DOCUMENTS

| | | | |
|---|---|---|---|
| 9,178,583 B2 | 11/2015 | Nam et al. | |
| 9,344,240 B2 | 5/2016 | Kim et al. | |
| 2014/0119223 A1* | 5/2014 | Song | H04W 72/085 370/252 |
| 2014/0348260 A1* | 11/2014 | Lorca Hernando | H04B 7/0617 375/295 |
| 2015/0049704 A1 | 2/2015 | Park et al. | |
| 2015/0215987 A1* | 7/2015 | Kim | H04W 76/04 370/329 |
| 2016/0182198 A1* | 6/2016 | Won | H04L 5/0035 370/329 |

(Continued)

FOREIGN PATENT DOCUMENTS

| | | | | |
|---|---|---|---|---|
| WO | WO-2012125931 A1 * | 9/2012 | ............ | H04B 7/0617 |
| WO | WO-2013181825 A1 * | 12/2013 | ............ | H04W 48/18 |
| WO | WO-2017014557 A1 * | 1/2017 | ............ | H04W 24/02 |

*Primary Examiner* — Paul H Masur
*Assistant Examiner* — Michael K Phillips

(57) ABSTRACT

A method for adaptive Multiple-Input and Multiple-Output (MIMO) transmission modes (TMs) in wireless communication networks. The method comprising receiving an attachment request from a User Equipment (UE). The method further comprising retrieving a Subscriber Profile ID (SPID) for the UE, and qualifying the UE for an enhanced MIMO TM based on the SPID. If the UE qualifies, then determining if the UE is capable of the enhanced MIMO TM. If the UE is capable of the enhanced MIMO TM, then assigning the UE to the enhanced MIMO TM, and receiving a Rank Indicator (RI) from the UE. If the RI is less than a RI threshold, assigning the UE to a lower MIMO TM.

16 Claims, 6 Drawing Sheets

(56) References Cited

U.S. PATENT DOCUMENTS

2017/0347220 A1* 11/2017 Hole .................... H04W 4/001
2018/0049047 A1*  2/2018 Lin ..................... H04W 24/02
2018/0063856 A1*  3/2018 Yang ................... H04W 72/12

* cited by examiner

WIRELESS COMMUNICATION SYSTEM FOR ADAPTIVE MULTIPLE-INPUT MULTIPLE-OUTPUT (MIMO) TRANSMISSION MODES

TECHNICAL BACKGROUND

User Equipment (UEs), such as mobile phones are used for services such as voice and video calling, Internet access and web browsing, media streaming, data messaging, E-mail, and the like. To receive these services, UEs connect to a wireless communication network. UEs attach to wireless access nodes such as a base station or Long Term Evolution (LTE) evolved Node B (eNodeB), to receive the wireless communication services of the wireless communication network. A UE may periodically report information such as Rank Indicator (RI), signal strength, and location to the wireless access node.

Wireless communication networks may use multiple-input and multiple-output (MIMO) transmission schemes when transferring communications to UEs. MIMO uses multiple antennas in a wireless access node in order to improve communication transfer performance. The improvements in communication transfer performance may include increased wireless range and data throughput. Some examples of MIMO wireless protocols include Worldwide Interoperability for Microwave Access (WiMAX), Long Term Evolution (LTE), and the latest 802.11n wireless protocols (Wi-Fi). MIMO uses different transmission modes depending on the network resources available and UE requirements. Different transmission modes may offer different performance and require different signaling.

Overview

Examples disclosed herein provide a system, method, hardware, and software for adaptive Multiple-Input and Multiple-Output (MIMO) Transmission Modes (TM). The method comprises receiving an attachment request from a User Equipment (UE). The method further comprises retrieving a Subscriber Profile ID (SPID) for the UE, and qualifying the UE for enhanced MIMO TM based on the SPID. If the UE qualifies, then determining if the UE is capable of the enhanced MIMO TM. If the UE is capable of the enhanced MIMO TM, then assigning the UE to the enhanced MIMO TM, and receiving a Rank Indicator (RI) from the UE. If the RI is less than a RI threshold, then assigning the UE to a lower MIMO TM.

In another example, a wireless communication system for adaptive MIMO TMs. The wireless communication system comprising a wireless access node configured to receive an attachment request from a UE. The wireless access node further configured to retrieve a SPID for the UE, and qualifying the UE for an enhanced MIMO TM based on the SPID. If the UE qualifies, then the wireless access node is configured to determine if the UE is capable of the enhanced MIMO TM. If the UE is capable of the enhanced MIMO TM, then the wireless access node assigning the UE to the enhanced MIMO TM, and receiving a RI from the UE. If the RI is less than a RI threshold, then the wireless access node assigning the UE to a lower MIMO TM.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
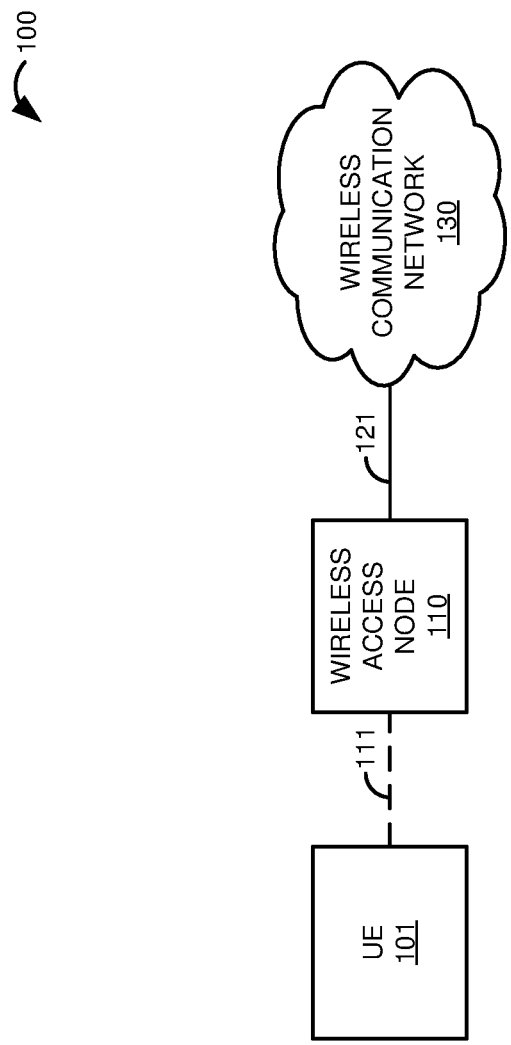
FIG. 1 illustrates a wireless communication system for adaptive Multiple-Input Multiple-Output (MIMO) Transmission Modes (TMs).

FIG. 1 illustrates wireless communication system 100 for adaptive Multiple-Input and Multiple-Output (MIMO) Transmission Modes (TMs). Wireless communication system 100 includes User Equipment 101, wireless access node 110, and wireless communication network 130. UE 101 and wireless access node 110 communicate over wireless link 111. Wireless access node 110 and wireless communication network 130 communicate over communication link 112. Links 111-112 could be direct links or they might include various intermediate components, systems, and networks.

In operation, wireless access node 110 receives an attachment request from UE 101. For example, UE 101 may be requesting a data communication service such as media streaming or video calling. Wireless access node 110 retrieves a Subscriber Profile ID (SPID) for UE 101, and qualifies UE 101 for an enhanced MIMO TM based on the SPID. In some examples, the SPID is not required, and UE 101 is qualified using other information. In some examples, the SPID indicates whether the UE is roaming, prepaid, or high data usage. If UE 101 qualifies for the enhanced MIMO TM, then wireless access node 110 determines whether UE 101 is capable of the enhanced MIMO TM. In some examples, the determination of whether a UE is capable of the enhanced MIMO TM is only done for preferred UEs, such as non-roaming UEs or other preferred UEs.

If UE 101 is capable of the enhanced MIMO TM, then wireless access node 110 assigns UE 101 to the enhanced MIMO TM, and receives a Rank Indicator (RI) from UE 101. If the RI is less than a RI threshold, then wireless access node 110 assigns UE 101 to a lower MIMO TM. In some examples, wireless access node 110 assigns UE 101 to TM3. In other examples, wireless access node 110 assigns UE 101 to TM4.

Examples of UE 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof. Examples of wireless access node 110 include wireless relays, femto-cell base stations, pico-cell base stations, macro-cell base stations or LTE eNodeBs.

Figure 2:
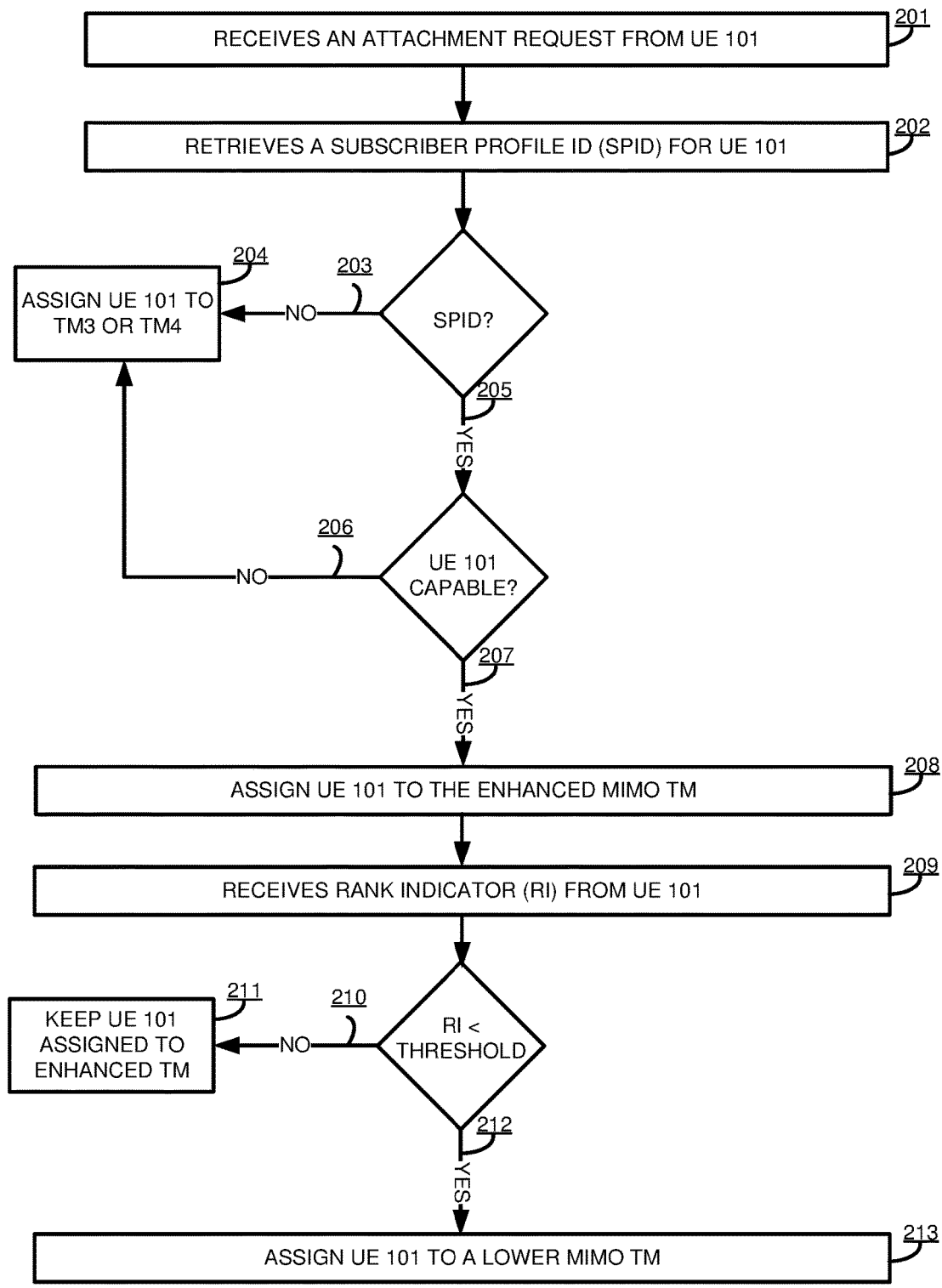
FIG. 2 illustrates the operation of the wireless communication system for adaptive MIMO TMs.

FIG. 2 illustrates the operation of wireless communication system 100 for adaptive MIMO TMs. Wireless access node 110 receives an attachment request from UE 101 (201). In some examples, the UE attachment request may be transmitted in MIMO TM2. Wireless access node 110 retrieves a Subscriber Profile ID (SPID) for UE 101 (202). In some examples, wireless access node 110 may transfer a request for the SPID to a Home Subscriber Server (HSS) of wireless communication network 130. If the SPID indicates that adaptive MIMO should not be used (203), then wireless access node 110 assigns UE 101 to TM3. For example, the SPID may indicated that UE 101 is roaming, adaptive MIMO TMs may be turned off for roaming UEs.

If the SPID indicates that adaptive MIMO TMs should be used (205), then wireless access node 110 determines if UE 101 is capable of an enhanced MIMO TM. If UE 101 is not capable of the enhanced MIMO TM, then wireless access node 110 assigns UE to TM3 (206). If UE 101 is capable of the enhanced MIMO TM (207), then wireless access node 110 assigns UE 101 to the enhanced MIMO TM (208).

Wireless access node 110 receives a Rank Indicator (RI) from UE 101 (209). If the RI is greater than an RI threshold (210), then UE 101 stays on the enhanced MIMO TM (211). If the RI is less than the RI threshold (212), then wireless access node 110 assigns UE 101 to a lower MIMO TM (212). For example, a Rank 1 indicates that UE 101 reports a good Signal-to-Interference plus Noise Ratio (SINR) on only one antenna layer and therefore, enhanced MIMO TMs such as MIMO TM9 would not be available.

Figure 3:
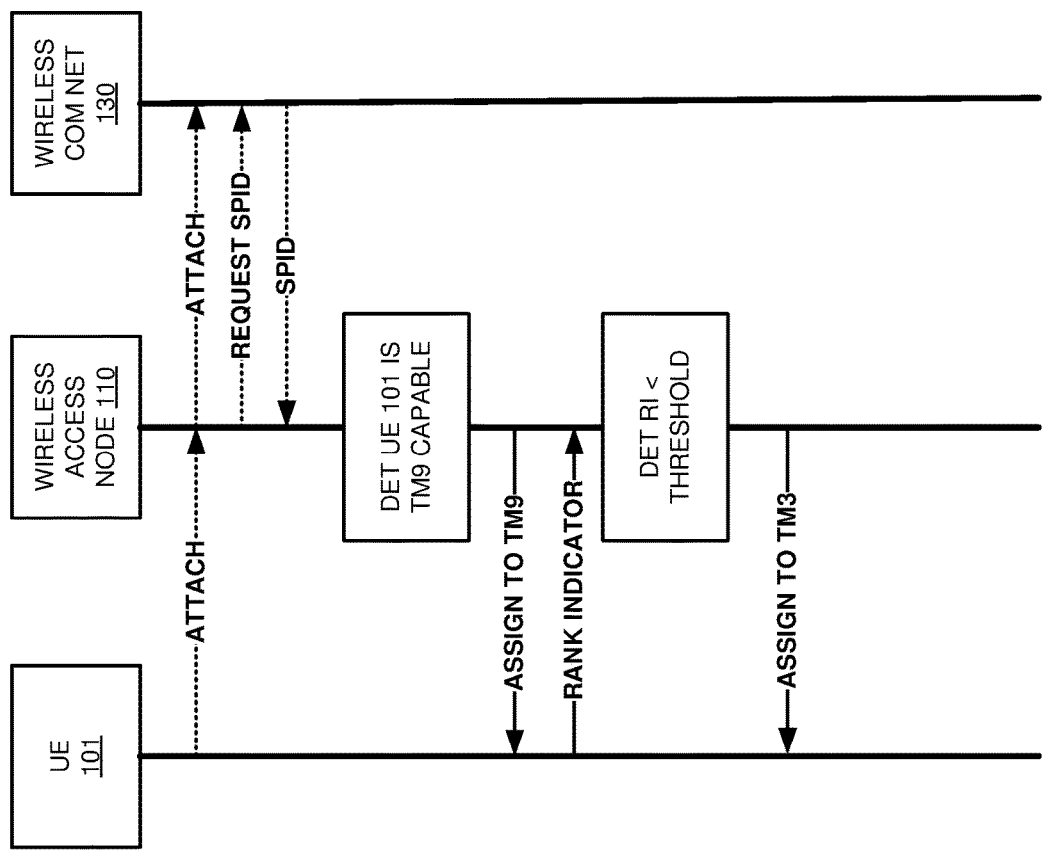
FIG. 3 illustrates the operation of the wireless communication system for adaptive MIMO TMs.

FIG. 3 illustrates the operation of wireless communication system 100 for adaptive MIMO TMs. UE 101 attaches to wireless access node 110. In some examples, UE 101 is requesting a data communication service. Wireless access node 110 receives the attachment request from UE 101. Wireless access node 110 requests a SPID for UE 101 from wireless communication network 130. Wireless communication network 130 transfers the SPID for UE 101 to wireless access node 110. Wireless access node 110 qualifies UE 101 for an enhanced MIMO TM based on the SPID.

If UE 101 qualifies for the enhanced MIMO TM, then wireless access node 110 determines if UE 101 is capable of the enhanced MIMO TM. In some examples, the determination of whether a UE is capable of the enhanced MIMO TM is only done for preferred UEs, such as non-roaming UEs or other preferred UEs.

UE 101 is capable of the enhanced MIMO TM, so wireless access node 110 assigns UE 101 to the enhanced MIMO TM. UE 101 transfers a Rank Indicator (RI) for delivery to wireless access node 110. Wireless access node 110 receives the RI from UE 101 and determines if the RI is less than an RI threshold. In some examples, the RI threshold is two. In this example, the RI is less than the RI threshold, so wireless access node 110 assigns UE 101 to a lower MIMO TM such as MIMO TM3.

Figure 4:
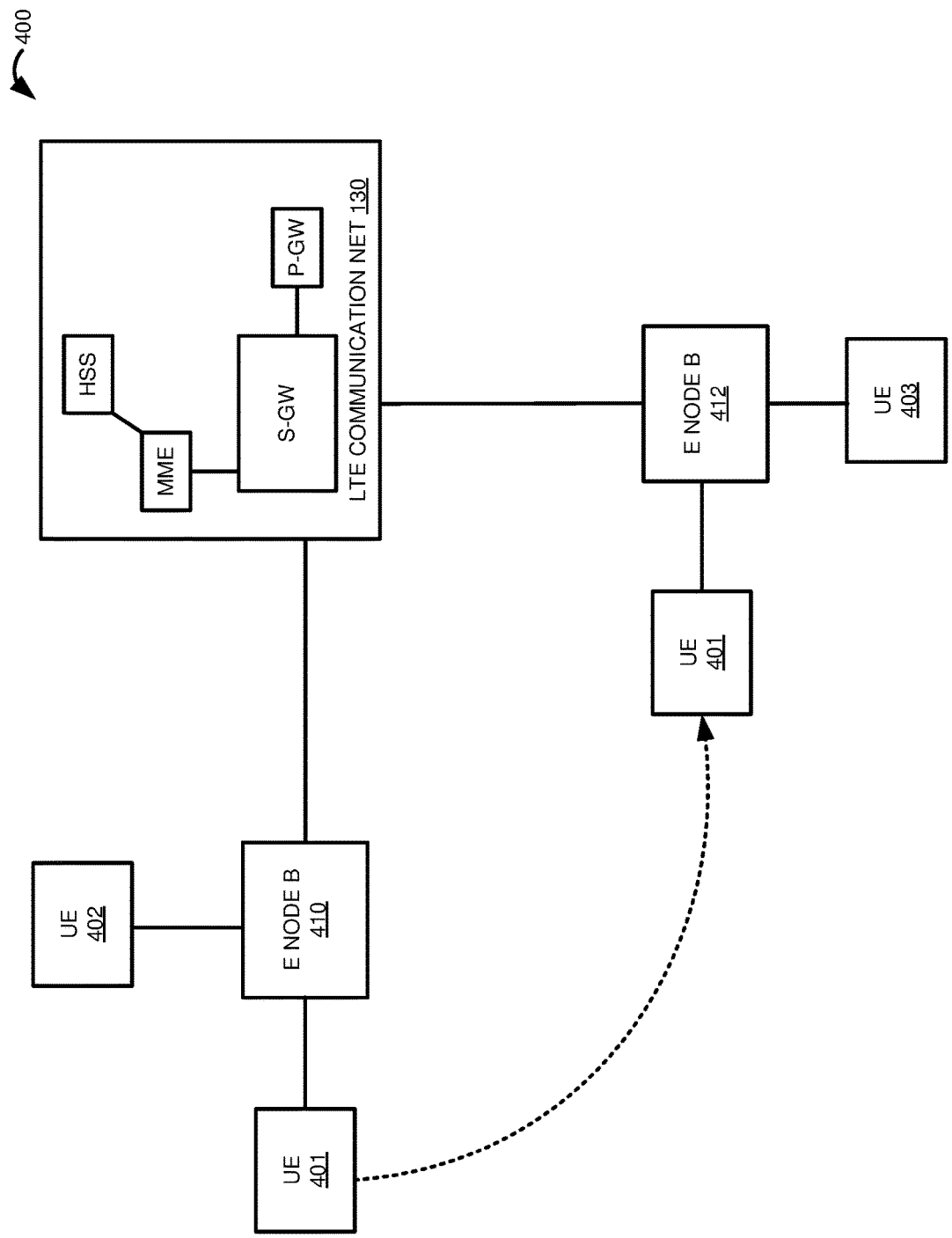
FIG. 4 illustrates a Long Term Evolution (LTE) communication network for adaptive MIMO TMs.

FIG. 4 illustrates LTE communication system 400 for adaptive MIMO TMs. LTE communication system includes UEs 201-203, eNodeBs 410-411, and LTE communication network 430. LTE communication network 430 includes Serving Gateway (S-GW), Multimedia Management Entity (MME), and Home Subscriber Server (HSS). LTE communication network 430 may include other elements not shown for clarity.

In one example, UE 401 attaches to eNodeB 410. ENodeB 410 receives the attachment request from UE 401. ENodeB 410 requests a SPID for UE 401 from LTE communication network 430. In some examples, the request for the SPID is transferred to the HSS. LTE communication network 430 transfers the SPID for UE 401 to eNodeB 410. Although not required, eNodeB 410 qualifies UE 401 for an enhanced MIMO TM based on the SPID. In addition to retrieving the SPID for UE 401, eNodeB 410 determines that UE 401 is moving and determines a velocity for UE 401. The velocity of UE 401 is above a velocity threshold, therefore although the SPID indicates adaptive MIMO TMs should be used, and UE 401 is capable of the enhanced MIMO TM, UE 401 is assigned to MIMO TM3.

In another example, UE 402 attaches to eNodeB 410. ENodeB 410 requests a SPID for UE 402 from LTE communication network 430. LTE communication network 430 transfers the SPID for UE 402 to eNodeB 410. The SPID for UE 402 indicates that UE 402 is a high data user, therefore, eNodeB 410 does not apply adaptive MIMO TMs and assigns UE 401 to MIMO TM3.

In yet another example, UE 403 attaches to eNodeB 420. ENodeB 420 requests a SPID for UE 403 from LTE communication network 430. LTE communication network 430 transfers the SPID for UE 403 to eNodeB 420. The SPID for UE 403 indicates that adaptive MIMO TMs should be used. For example, UE 403 may be a preferred user. ENodeB 420 also determines a velocity for UE 403. The velocity of UE 403 is less than a threshold velocity, so eNodeB 420 assigns UE 403 to the enhanced MIMO TM. For example, UE 403 may be stationary.

UE 403 switches to the enhanced MIMO TM and transfers a RI for delivery to eNodeB 420. ENodeB 420 receives the RI from UE 401 and determines if the RI is less than an RI threshold. In some examples, the RI threshold is two. In this example, the RI is greater than the RI threshold, so UE stays on the enhanced MIMO TM, rather than switching to a lower MIMO TM.

Figure 5:
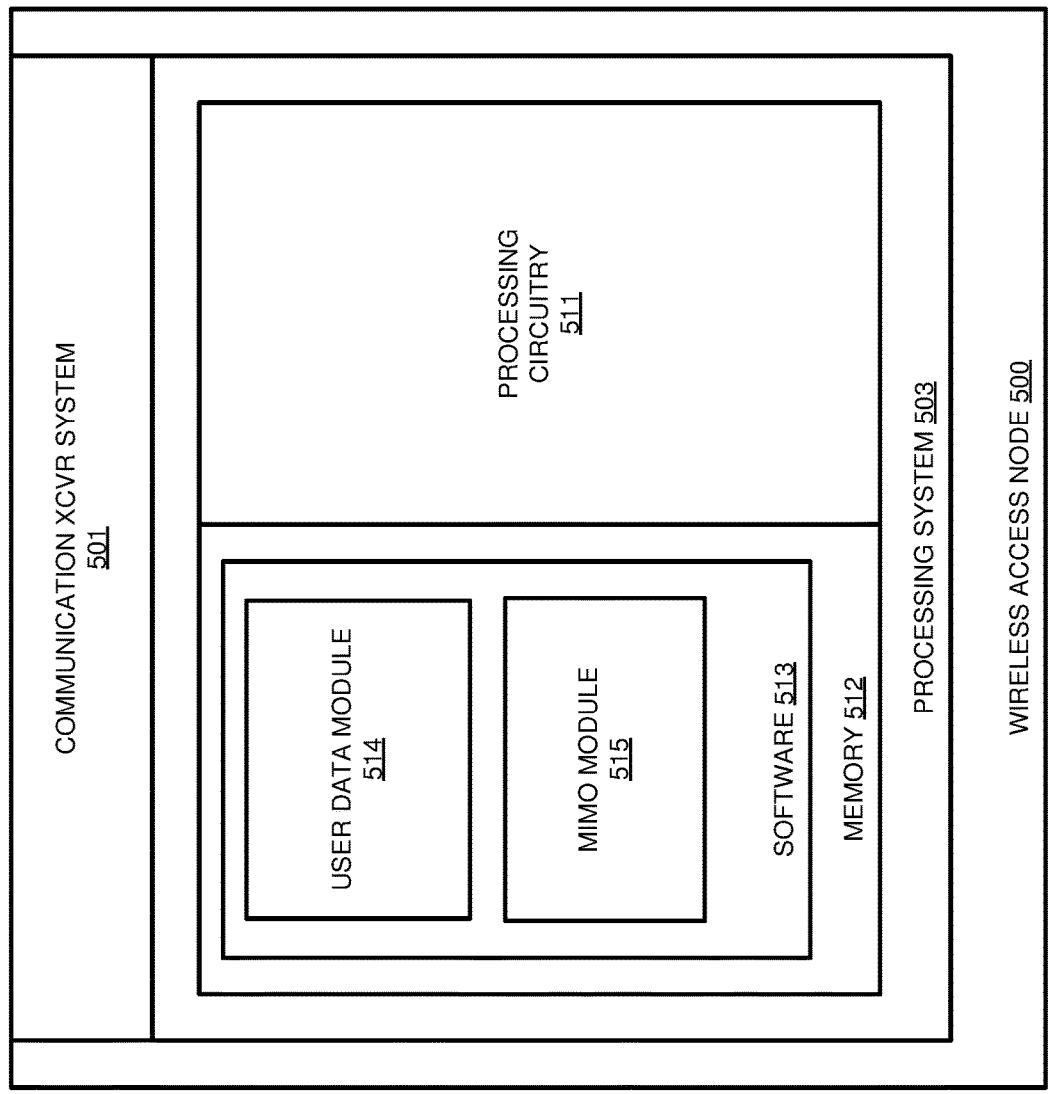
FIG. 5 illustrates a wireless access node for adaptive MIMO TMs.

FIG. 5 illustrates wireless access node 500 for adaptive MIMO. Wireless access node 500 is an example of wireless access node 110 and eNodeBs 411-412. Although these systems may use alternative configurations and operations. Wireless access node 500 comprises communication transceiver system 501 and processing system 503. Processing system 503 includes processing circuitry 511 and memory 512 that stores software 513. Software 513 comprises software modules 514-515.

Communication transceiver system 501 comprise components that communicate over communication links such as network cards, ports, RF transceivers, processing circuitry and software, or some other communication components. Communication transceiver system 501 may be configured to communicate over metallic, wireless, or optical links. Communication transceiver system 501 may be configured to use TDM, IP, Ethernet, optical networking, wireless protocols, communication signaling, or some other communication format—including combinations thereof. Communication transceiver system 501 transmit and receive user data and control signaling.

Processing circuitry 511 comprises microprocessor and other circuitry that retrieves and executes operating software 513 from memory 512. Processing circuitry 511 may comprise a single device or could be distributed across multiple devices—including devices in different geographic areas. Processing circuitry 511 may be embedded in various types of equipment. Examples of processing circuitry 511 include central processing units, application specific processors, logic devices, and/or any type of computer processing devices—including combinations thereof.

Memory 512 comprises a non-transitory computer readable storage medium readable by processing system 503 and capable of storing software 513, such as a disk drive, flash drive, data storage circuitry, or some other hardware memory apparatus—including combinations thereof. Memory 512 can include volatile and/or non-volatile, removable and non-removable media implemented in any method or technology for storage of information, such as computer readable instructions, data structures, program modules, or other data—including combinations thereof. Memory 512 may comprise a single device or could be distributed across multiple devices—including devices in different geographic areas. Memory 512 may be embedded in various types of equipment. In some examples, a computer apparatus could comprise memory 512 and software 513.

Software 513 comprises computer programs, firmware, or some other form of machine-readable processing instructions. Software 513 may include an operating system, utilities, drivers, network interfaces, applications, or some other type of software. In this example, software 513 comprises user data module 514 and MIMO module 515. Although software 513 could have alternative configurations in other examples. Software 513 may be implemented in program instructions and may be executed by processing system 503. Software 513 may include additional processes, programs, or components, such as operating system software, database software, or application software—including combinations thereof. Software 513 may also comprise firmware or some other form of machine-readable processing instructions executable by processing system 503.

When executed, software 513 directs processing system 503 to operate as described herein to implement adaptive MIMO. In particular, user data module 514 directs processing system 503 to receive and transfer user data to UEs. MIMO module 515 directs processing system 503 to assign UE to a MIMO TM.

Figure 6:
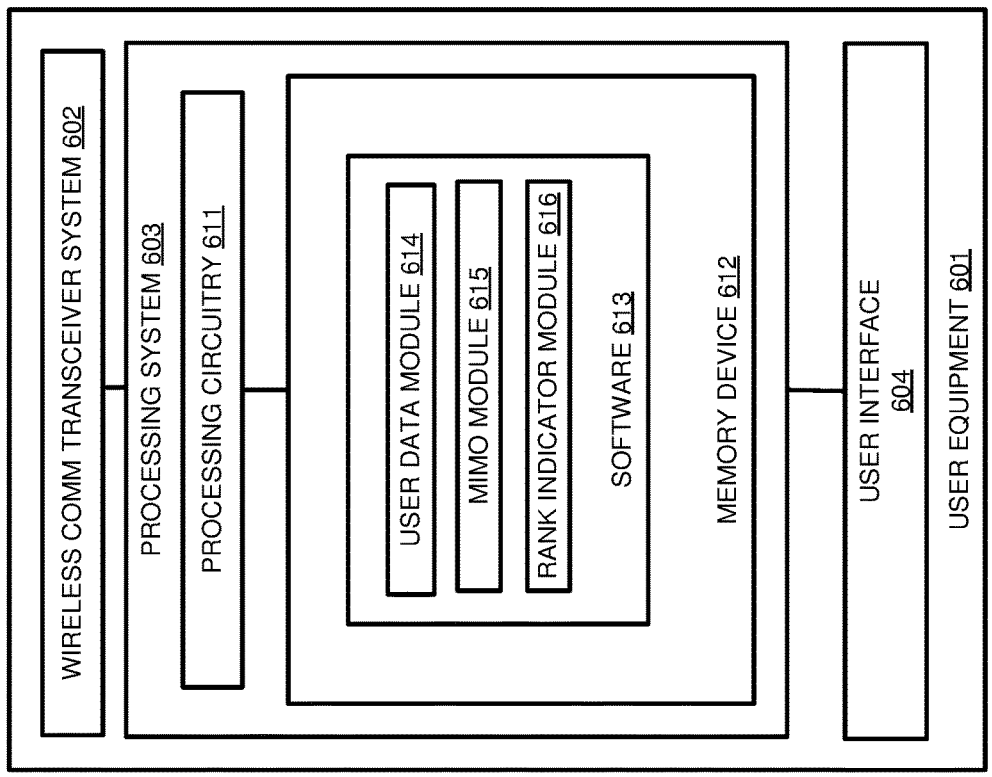
FIG. 6 illustrates a User Equipment (UE) for adaptive MIMO TMs.

FIG. 6 illustrates User Equipment (UE) 601. UE 601 is an example of UEs 101 and 401-403, although UEs 101 and 401-403 could use alternative configurations. UE 601 comprises wireless communication transceiver system 602, processing system 603, and user interface 604. Processing system 603 is linked to wireless communication transceiver system 602 and user interface 604. Processing system 603 includes processing circuitry 611 and memory device 612 that stores operating software 613. UE 601 may include other well-known components such as a battery and enclosure that are not shown for clarity. UE 601 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 602 comprises Radio Frequency (RF) communication circuitry and an antenna. The RF communication circuitry typically includes an amplifier, filter, RF modulator, and signal processing circuitry. Wireless communication transceiver system 602 may also include a memory device, software, processing circuitry, or some other communication device. Wireless communication transceiver system 602 may use various communication formats, such as LTE, CDMA, EVDO, WIMAX, GSM, WIFI, HSPA, or some other wireless communication format—including combinations thereof.

User interface 604 comprises components that interact with a user to receive user inputs and to present media and/or information. User interface 604 may include a speaker, microphone, buttons, lights, display screen, touch screen, touch pad, scroll wheel, communication port, or some other user input/output apparatus—including combinations thereof. User interface 604 may be omitted in some examples.

Processing circuitry 611 comprises microprocessor and other circuitry that retrieves and executes operating software 613 from memory device 612. Memory device 612 comprises a non-transitory storage medium, such as a disk drive, flash drive, data storage circuitry, or some other memory apparatus. Processing circuitry 611 is typically mounted on a circuit board that may also hold memory device 612, portions of wireless communication transceiver system 602, and user interface 604.

Software 613 comprises computer programs, firmware, or some other form of machine-readable processing instructions. Software 613 may include an operating system, utilities, drivers, network interfaces, applications, or some other type of software. When executed by processing circuitry 611, software 613 directs processing system 603 to operate UE 601 as described herein.

When executed, software 613 directs processing system 603 to operate as described herein for adaptive MIMO TMs. In particular, user data module 614 directs processing system 603 to send and receive user data. MIMO module 615 directs processing system 603 to operate in the assigned TM. Rank Indicator module 616 directs processing system 603 to transfer the Rank Indicator to the wireless access node.

Referring back to FIG. 1, UE 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. UE 101 may also include a user interface, memory system, software, processing circuitry, or some other communication components. For example, UE 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by UE 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between UE 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus.

Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Wireless communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof.

Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof.

Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for adaptive multiple-input multiple-output (MIMO) transmission modes (TMs) in wireless networks, the method comprising:
   receiving an attachment request from a User Equipment (UE);
   retrieving a Subscriber Profile ID (SPID) for the UE and qualifying the UE for an enhanced MIMO TM based on the SPID;
      if the UE qualifies, then determining if the UE is capable of the enhanced MIMO TM;
         if the UE is capable of the enhanced MIMO TM, then assigning the UE to the enhanced MIMO TM;
   receiving a Rank Indicator (RI) from the UE in enhanced MIMO TM, and if the RI is less than a RI threshold, then assigning the UE to a lower MIMO TM, wherein the lower MIMO TM comprises at least one of MIMO TM3 and MIMO TM4.

2. The method of claim 1 further comprising:
   determining a velocity for the UE; and
      if the velocity is greater than a threshold, then assigning the UE to a lower MIMO TM.

3. The method of claim 2 further comprising:
   determining a Signal-to-Interference plus Noise Ratio (SINR) for the UE; and
   if the SINR is greater than a SINR threshold, then assigning the UE to a lower MIMO TM.

4. The method of claim 1 further comprising:
   determining a velocity for the UE;
   determining a Signal-to-Interference plus Noise Ratio (SINR) for the UE; and
      if the velocity is greater than a velocity threshold, the SINR is greater than a SINR threshold, and the RI is less than the RI threshold, then assigning the UE to MIMO TM3.

5. The method of claim 1 further comprising:
   determining a velocity for the UE;
   determining a Signal-to-Interference plus Noise Ratio (SINR) for the UE; and
      if the velocity is less than a velocity threshold, the SINR is greater than a SINR threshold, and the RI is less than the RI threshold, then assigning the UE to MIMO TM4.

6. The method of claim 1 wherein qualifying the UE for the enhanced MIMO TM comprises determining whether the UE is a roaming UE.

7. The method of claim 1 wherein qualifying the UE for the enhanced MIMO TM comprises determining whether the UE is a prepaid UE.

8. The method of claim 1 wherein qualifying the UE for the enhanced MIMO TM comprises determining whether the UE is a high data UE.

9. A wireless communication system for adaptive multiple-input multiple-output (MIMO) transmission modes (TMs), the wireless communication system comprising:
   a wireless access node configured to receive an attachment request from a User Equipment (UE);
   the wireless access node configured to retrieve a Subscriber Profile ID (SPID) for the UE, and qualify the UE for an enhanced MIMO TM based on the SPID;
   if the UE qualifies for the enhanced MIMO TM, then determining if the UE is capable of the enhanced MIMO TM;
   if the UE is capable of the enhanced MIMO TM, then the wireless access node configured to assign the UE to the enhanced MIMO TM;
   the UE configured to transfer a Rank Indicator (RI) for delivery to the wireless access node, and if the RI is less than a RI threshold, then the wireless access node configured to assign the UE to a lower MIMO TM, wherein the lower MIMO TM comprises at least one of MIMO TM3 and MIMO TM4.

10. The wireless communication system of claim 9 further comprising:
    the wireless access node configured to determine a velocity for the UE; and
       if the velocity is greater than a threshold, then the wireless access node configured to assign the UE to a lower MIMO TM.

11. The wireless communication system of claim 10 further comprising:
    the wireless access node configured to determine a Signal-to-Interference plus Noise Ratio (SINR) for the UE; and
       if the SINR is greater than a SINR threshold, then the wireless access node configured to assign the UE to a lower MIMO TM.

12. The wireless communication system of claim 9 further comprising:
    the wireless access node configured to determine a velocity for the UE;
    the wireless access node configured to determine a Signal-to-Interference plus Noise Ratio (SINR) for the UE; and
       if the velocity is greater than a velocity threshold, the SINR is greater than a SINR threshold, and the RI is less than the RI threshold, then the wireless access node configured to assign the UE to MIMO TM3.

13. The wireless communication system of claim 9 further comprising:
    the wireless access node configured to determine a velocity for the UE;
    the wireless access node configured to determine a Signal-to-Interference plus Noise Ratio (SINR) for the UE; and
       if the velocity is less than a velocity threshold, the SINR is greater than a SINR threshold, and the RI is less than the RI threshold, then the wireless access node configured to assign the UE to MIMO TM4.

14. The wireless communication system of claim 9 wherein the wireless access node is configured to determine whether the UE is a roaming UE.

15. The wireless communication system of claim 9 wherein the wireless access node is configured to determine whether the UE is a prepaid UE.

16. The wireless communication system of claim 9 wherein the wireless access node is configured to determine whether the UE is a high data UE.

* * * * *